Patented June 11, 1940

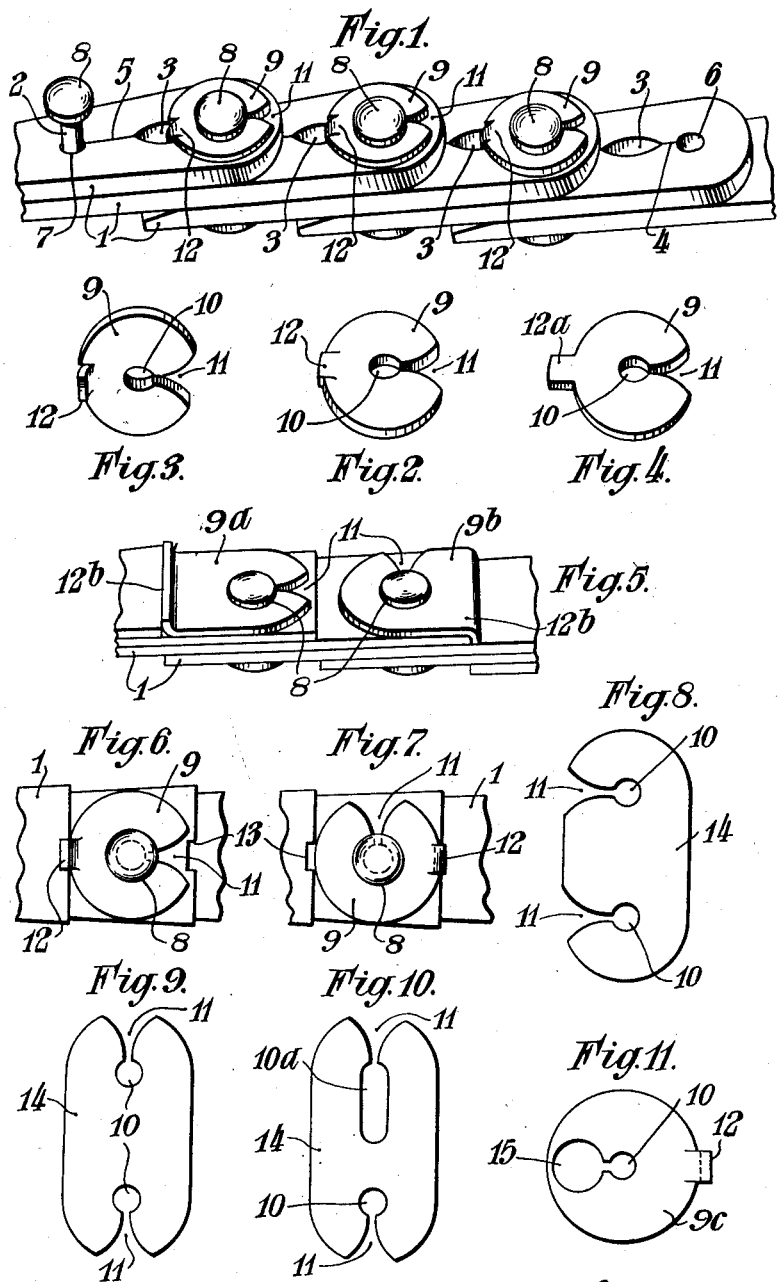

2,204,117

UNITED STATES PATENT OFFICE 2,204,117

DRIVING BELT

Harry Brammer, Leeds, England

Application February 16, 1938, Serial No. 190,865
In Great Britain February 17, 1937

9 Claims. (Cl. 74—236)

This invention relates to driving belts of the type comprising a number of superimposed links secured together by studs having integral heads.

The invention especially relates to belts of the type described in British Patent No. 340,065. In the said patent flexible links are formed with a plurality of holes therein joined by slits and furnished with a headed stud at one end. The links are assembled by passing the headed studs through adjacent links until a desired length of belting is formed. In the above patent the studs are arranged in a pendant position at the widest end of the tapered links, but they may be at the narrow end to project upwardly. Further, this invention is not confined to V-belting.

In belting of the above type the studs assume an inclined position and part of the peripheral edge of the stud head is caused to bind against the surface of the adjacent link with the result the link becomes cut or frayed. To obviate this it would be necessary to provide large heads on the studs to increase the bearing surface. The latter construction is not allowable as the head must be kept within certain dimensional limits relative to the width of the belt so that the heads can be threaded easily through the links during assembly and the strength of the belt maintained.

The object of this invention is to prevent the said damage to the links taking place.

According to this invention there is provided in or for driving belts of the above described type, a collar for the headed stud of a link, said collar being adapted for location between a link and the integral head of the stud to form a bearing element.

The invention also includes in or for driving belts of the above described type, a collar for location between the integral head of a stud and an adjacent link and furnished with means for preventing its rotation when in position.

The invention embraces also a collar having an opening for the stud and a stud access slit or slot leading thereto from the perimeter of the collar.

Moreover the collar may be made of a comparatively flexible material having a certain inherent stiffness such as raw hide or metal and particularly hard horny raw hide.

Further, a collar may be made common to two or more studs and furnished with two or more stud openings for such purpose.

Referring now to the accompanying drawing in which several embodiments of the invention are shown by way of example only:

Fig. 1 is a perspective view of a portion of a belt with this invention applied thereto;

Fig. 2 is a perspective view of a collar constructed according to the invention;

Fig. 3 is a perspective view from below of the collar with the locking tongue depressed;

Fig. 4 is a perspective view from above of a slightly modified collar;

Fig. 5 is a perspective view of a portion of a belt with a collar having a turned up end and a collar with a turned down end applied thereto;

Fig. 6 is a plan view of a portion of a belt with the link ends recessed to receive a tongue of a collar;

Fig. 7 is a plan view showing a modification of the arrangement in Fig. 6;

Fig. 8 is a plan view of a double collar for a belt having side by side studs;

Fig. 9 is a plan view of a modified double collar;

Fig. 10 is a plan view of a modification of the collar in Fig. 9;

Fig. 11 is a plan view of a single collar with a stud access hole instead of a slot.

Fig. 1 shows a portion of a belt composed of superimposed links 1 held together by headed studs 2 which are riveted to the narrow ends of the links and threaded up through elongated holes 3 and forced along the slits 4 or 5 into the stud holes 6 or 7 as the case may be.

The heads 8 are integral with the studs 1 and the collars 9 located beneath the heads are formed of raw hide (or other material) and of circular formation. As shown in Figs. 2 and 3, a hole 10 is formed in each collar 9 of a size that will receive the stud 2 of a belt link 1, and a slot 11 is provided extending from the hole 10 to the perimeter of the collar. The slot 11 is of a width that will afford passage of the stud 2 to the hole 10 when locating the collar 9 on a stud between its head 8 and the face of a link 1. The sides of the slot 11 at its outer end are curved to facilitate the entrance of a stud 2.

To prevent a collar 9 turning round on a stud 2, a tongue 12 is provided to enter the hole 3 in a link 1. The tongue 12 is formed by making two parallel cuts in the collar and pressing the portion between the slits to a position at or about a right angle to the face of the collar.

Each collar 9 is first mounted on a stud 2 and the tongue 11 is then pressed down into the hole 3 in the link 1 when the raw hide collar is moist and pliable so that the tongue will harden in its set position.

Further, the collar is adapted to present an unbroken bearing surface at the point of greatest pressure by the stud head.

In the modification shown in Fig. 4 the tongue 12a is provided as a projection from the periphery of the collar.

In Fig. 5 are shown two somewhat similar types of collars 9a, 9b applied to a belt wherein the ends of the links are straight cut. The collar 9a is cut straight at one end and turned up to form a tongue 12b which abuts against the end of the next link. In the collar 9b the tongue 12b is turned down over the end of the link the collar rests upon and the slot 11 is formed parallel with the tongue.

Fig. 6 shows a collar 9 with its tongue turned up into a recess 13 in the end of the next link, whilst in Fig. 7 the collar has its tongue turned down into the recess 13 in the link upon which the collar rests. In this latter construction the slot 11 is formed laterally in the link.

Separate fastening means such as nails, clips or the like may be employed in place of, or additional to, the aforesaid tongues, or the washers may have no fastening means.

In a further modification shown in Fig. 8 a collar 14 is made common to two studs and furnished with an equivalent number of stud holes 10 and access slots 11 which extend from one longitudinal side of the collar. When the slots 11 extend from the ends of a collar 14, as shown in Fig. 9, the collar will require to be bent and sprung into position and will thus be held securely in position. If the collar requires to be slid into position, one hole 10a is elongated, as shown in Fig. 10, and is the first to be engaged with a stud 2 when the collar may be retracted to engage a second stud 2.

In the modified construction shown in Fig. 11, the access slot for mounting a collar 9c upon a stud is dispensed with and the hole 10 for the stud is adapted to communicate with a second hole 15 of a diameter that will permit the passage of the stud head 8. In this manner a collar 9c can be slipped over a stud head 8 and slid into position.

When raw hide and like material is employed, the edge or edges of a collar may be chamfered to prevent any fraying or cutting of the belt links.

What I claim is:

1. A laminated link driving belt comprising a plurality of links arranged in successively stepped layers one upon the other with each link partially overlapping a next succeeding link, headed fastening elements having shanks extending through the overlapped ends of said links, the layered stepped arrangement of said links producing a rocking tendency in said fastening elements when the belt is tensioned, a wear receiving collar interposed between the head of each of said fastening elements and the adjacent link surface to form a bearing surface receiving the wear from said heads incident to the rocking of said fastening elements upon tensioning of said belt, said wear receiving collars being formed to permit ready insertion into or removal thereof from position under said heads without dismantling the belt structure, and means for retaining said wear receiving collars against rotation when in position under said heads.

2. A laminated link driving belt comprising a plurality of links arranged in successively stepped layers one upon the other with each link partially overlapping a next succeeding link, headed fastening elements extending through overlapping ends of said links, the layered stepped arrangement of said links producing a rocking tendency in said fastening elements upon tensioning of the belt, a replaceable wear receiving collar interposed between the head of each fastening element and the adjacent link surface to form a bearing element for said head, said collars being formed to permit insertion into or removal from position under said heads without dismantling the belt structure, and means on said collars for engaging a part of said belt structure to prevent rotation of said collars when in position under said heads.

3. In a laminated link driving belt comprising a plurality of superimposed overlapping links arranged in stepped relation, a headed fastening element having a shank portion extending through the overlapping ends of said links, the stepped overlapping relation of said links producing a rocking tendency in said fastening element upon tensioning of said belt, a replaceable wear receiving collar embracing the shank of said fastening element between the head thereof and the adjacent link surface to form a bearing element for said head, said collar having a radial split for passing said shank to facilitate insertion of said collar into or removal from position under said head, and means for retaining said collar against rotation when in position under said head.

4. In a laminated link driving belt comprising a plurality of superimposed overlapping links arranged in stepped relation, a headed fastening element having a shank portion extending through the overlapping ends of said links, the stepped overlapping relation of said links producing a rocking tendency in said fastening element upon tensioning of said belt, a replaceable wear receiving collar embracing the shank of said fastening element between the head thereof and the adjacent link surface to form a bearing element for said head, said collar having a radial split for passing said shank to facilitate insertion of said collar into or removal from position under said head, and means on said collar for engaging a part of said belt structure to prevent rotation of said collar when in position under said head.

5. In a laminated link driving belt comprising a plurality of superimposed overlapping links arranged in stepped relation with the end of each overlapping the end of a succeeding link, a headed stud having a shank portion passing through said overlapping ends, the stepped relation of said links producing a rocking tendency in said stud upon tensioning of said belt, a replaceable wear receiving collar interposed between said head and the adjacent link surface to form a bearing element for said head, said collar having one hole therein large enough to pass the head of said stud and a smaller hole for the normal reception of said shank portion but not large enough to pass said head, said collar being formed to provide a communicating passage between said holes, and means for retaining said collar against rotation when in position under said head.

6. In a laminated link driving belt comprising a plurality of superimposed overlapping links arranged in stepped relation with an end of each overlapping an end of a succeeding link, a headed stud having a shank portion passing through said overlapping ends, a replaceable wear receiving collar interposed between said head and the adjacent link surface to form a bearing element for said head, said collar having one hole therein large enough to pass the head of said stud and a smaller hole for the normal reception of said shank portion but not large enough to pass said head, said collars being formed to provide a communicating passage between said holes, and means on said collar for engaging a part of said belt structure to prevent rotation of said collar when in position under said head.

7. In a laminated driving belt comprising a plurality of superimposed overlapping links arranged successively in stepped relation, a headed fastening element having a shank portion extending through the overlapping ends of said links, a replaceable wear receiving collar embracing the shank of said fastening element between the head thereof and the adjacent link surface to form a bearing element for said head, said collar having a radial split for passing said shank to facilitate insertion of said collar into or removal from position under said head, one of said links having a recess adjacent said headed stud and a tongue on said collar for engaging in said recess to prevent rotation of said collar on said shank.

8. In a laminated link driving belt comprising a plurality of superimposed overlapping links arranged in stepped relation with an end of each overlapping an end of a succeeding link, a headed stud having a shank portion passing through said overlapping ends, a replaceable wear receiving collar interposed between said head and the adjacent link surface to form a bearing element for said head, said collar having one hole therein large enough to pass the head of said stud and a smaller hole for the normal reception of said shank portion but not large enough to pass said head, said collar being formed to provide a communicating passage between said holes, one of said links having a recess adjacent said headed stud and a tongue on said collar for engaging in said recess to prevent rotation of said collar on said shank.

9. In a laminated link driving belt comprising a plurality of superimposed overlapping links arranged in stepped relation with an end of each overlapping an end of a succeeding link, and a headed fastening element having a shank portion extending through the overlapping ends of said links, a raw-hide collar embracing the shank of said fastening element between the head thereof and the adjacent link surface to form a bearing element for said head, said collar having a substantially axially disposed opening sized to accommodate the shank of said fastening element and formed with an access slot extending from said axial opening to the perimeter of said collar to facilitate assembly of said collar on said shank, one of said links having a recess adjacent said headed stud, and a tongue on said collar formed to engage in said recess to lock said collar from rotation on said shank.

HARRY BRAMMER.